United States Patent
Tanaka

[11] Patent Number: 5,596,654
[45] Date of Patent: Jan. 21, 1997

[54] METHOD OF DETERMINING DESIRED IMAGE SIGNAL RANGE BASED ON HISTOGRAM DATA

[75] Inventor: Nobuyuki Tanaka, Kanagawa, Japan

[73] Assignee: Fuji Photo Film Co., Ltd., Kanagawa, Japan

[21] Appl. No.: 197,456

[22] Filed: Feb. 16, 1994

Related U.S. Application Data

[63] Continuation of Ser. No. 60,058, May 13, 1993, abandoned, which is a continuation of Ser. No. 784,744, Oct. 29, 1991, abandoned, which is a continuation of Ser. No. 382,043, Jul. 18, 1989, abandoned, which is a continuation of Ser. No. 183,961, Apr. 20, 1988, abandoned.

[30] Foreign Application Priority Data

Apr. 20, 1987 [JP] Japan ................................. 62-96716

[51] Int. Cl.$^6$ ............................................. G06K 9/36
[52] U.S. Cl. ................................. 382/168; 382/270
[58] Field of Search ........................... 382/18, 51, 50, 382/54, 9, 48, 168, 171, 173, 270, 271, 291

[56] References Cited

U.S. PATENT DOCUMENTS

| | | | |
|---|---|---|---|
| 4,538,277 | 8/1985 | Toraichi et al. | |
| 4,574,393 | 3/1986 | Blackwell | 382/18 |
| 4,656,665 | 4/1987 | Pennebaker | 382/18 |
| 4,682,028 | 7/1987 | Tanaka | 364/413.13 |
| 4,811,090 | 3/1989 | Khurana | 382/18 |

FOREIGN PATENT DOCUMENTS

| | | | |
|---|---|---|---|
| 0150834 | 1/1984 | European Pat. Off. | |
| 0189406 | 8/1986 | Japan | 382/51 |

OTHER PUBLICATIONS

Woods: "Real Time Digital Image Enhancement" Proceedings of the IEEE, May 1981–pp. 643–654.

*Primary Examiner*—Andrew Johns
*Attorney, Agent, or Firm*—Sughrue, Mion, Zinn, Macpeak & Seas

[57] ABSTRACT

A histogram of image signals carrying an image recorded on a recording medium is prepared. The histogram of the image signals is divided into a plurality of small regions by an automatic threshold value selecting method employing a discriminant criterion or a reference equivalent thereto. A desired small region corresponding to a desired image portion is distinguished in the small regions on the basis of information on the image recorded on the recording medium such as the image recording portion of the object, the recording method and the like, and a desired image signal range which is the range of the image signals carrying the desired image portion is determined on the basis of statistics on the desired small region.

8 Claims, 2 Drawing Sheets

RECORDING DIRECTION

METHOD OF DETERMINING DESIRED IMAGE SIGNAL RANGE BASED ON HISTOGRAM DATA

This is a continuation of application Ser. No. 08/060,058 filed May 13, 1993, now abandoned, which was a continuation of application Ser. No. 07/784,744, filed Oct. 29, 1991, abandoned, which was a continuation of application Ser. No. 07/382,043, filed Jul. 18, 1989, abandoned, which was a continuation of application Ser. No. 07/183,961, filed Apr. 20, 1988, abandoned.

BACKGROUND OF THE INVENTION

1. Field of the Invention

This invention relates to a method of determining, on the basis of a histogram of image signals carrying an image recorded on a recording medium such as a stimulable phosphor sheet, a desired image signal range, that is, a range of the image signals corresponding to a part of the image which is necessary for a diagnosis or the like.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion Co the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then exposed to stimulating rays such as a laser beam which cause the stimulable phosphor sheet to emit light in proportion to the stored radiation energy. The light emitted by the stimulable phosphor sheet upon stimulation thereof is photoelectrically detected and converted to an electric image signal, image processing is carried out on the electric image signal, and the radiation image of the object is reproduced as a visible image by use of the processed image signal on a recording medium such as a photographic film, a display device such as a cathode ray tube (CRT), or the like.

There are many cases where only a part of the recorded image is necessary. For example, in the case of an axial image recording of the lap carried out in the manner shown in FIG. 2, the recorded image is as shown in FIG. 3, and the image signal levels are broadly divided into four levels, one corresponding to an empty image portion A exposed to part of the radiation passing by the lap, another corresponding to an soft part image portion B exposed to part of the radiation passing through soft parts of the knee like skin, another corresponding to a knee image portion C exposed to part of the radiation passing through the knee, and the other corresponding to an overlapping bone image portion D exposed to part of the radiation passing through overlapping bones, the image signal level lowering in this order. In such a recorded image, only image information on the knee part C is generally necessary and image information on the other parts are not necessary. In such a case, it is preferred that the whole image be not reproduced as a visible image but only the knee part C which is necessary for the diagnosis be selectively reproduced within a predetermined density range suitable for viewing for a given diagnostic purpose, thereby improving the contrast and resolution.

In accordance with the method proposed in Japanese Unexamined Patent Publication No. 60(1985)-156055 in order to satisfy the demand, a preliminary read-out (A read-out operation for ascertaining the image information of a radiation image stored on the stimulable phosphor sheet which is carried out in advance by use of stimulating rays having stimulation energy of a level lower than the level of the stimulation energy of stimulating rays used in a final read-out operation for obtaining a visible image for viewing, particularly for diagnostic purposes, as described in Japanese Unexamined Patent Publication No. 58(1983)-67240.) is first carried out and a histogram of the image signals (image signal level) obtained by the preliminary read-out is then obtained. At the same time, the maximum image signal level Smax and the minimum image signal level Smin of a desired image signal range in the histogram are calculated, and the read-out conditions for the final read-out are adjusted so that the maximum image signal level Smax and the minimum image signal level Smin correspond respectively to the maximum signal level Qmax and the minimum signal level Qmin of a desired input signal range in an image processing means which are determined by the maximum density Dmax and the minimum density Dmin of the correct density range in the reproduced visible image. Thereafter said final read-out is carried out on the basis of the read-out conditions thus determined.

Further, it may be possible to satisfy the demand by obtaining a histogram of the image signals (image signal level) obtained by the preliminary read-out, calculating the maximum image signal level Smax and the minimum image signal level Smin of a desired image signal range in the histogram, adjusting the gradation processing conditions so that the maximum image signal level Smax and the minimum image signal level Smin correspond respectively to the maximum signal level Qmax and the minimum signal level Qmin of a desired input signal range in an image reproducing means (visible image output means) which are determined by the maximum density Dmax and the minimum density Dmin of the correct density range in the reproduced visible image and carrying out the gradation processing according to the gradation processing conditions thus determined.

In this method, the image signals obtained by the final read-out may be used instead of the image signals obtained by the preliminary read-out. Also in this case, a histogram of the image signals are first obtained and then said Smax and Smin are calculated and the gradation processing conditions are determined so that the Smax and Smin respectively correspond to said Rmax and Rmin.

By the term "read-out conditions" as used herein are meant various conditions affecting the relationship between the input (quantity of light emitted by the stimulable phosphor sheet upon stimulation) and the output (electric image signal level) of the photoelectric read-out means, e.g., the read-out gain (sensitivity) determining the relationship between the input and the output, the scale factor (latitude) and the level of the stimulating used in the read-out.

By the term "image processing conditions" as used herein are meant various conditions affecting the relationship between the input to the image processing means and the output thereof, for example, gradation processing conditions and frequency response processing conditions.

As mentioned above, the level of the stimulating rays used in the preliminary read-out is adjusted to be lower than the level of the stimulating rays used in the final read-out. That is, the effective energy of the stimulating rays which the stimulable phosphor sheet receives per unit area in the preliminary read-out is adjusted to be lower than the effective energy of the stimulating rays used in the final read-out.

In order to carry out the methods described above, the desired image signal range, that is, the Smax and Smin must be appropriately determined. However, in the method disclosed in Japanese Unexamined Patent Publication No. 60(1985)-156055, the desired image signal range in a given histogram is roughly determined referring to the pattern of the histogram which depends upon the image recording portion of the object and/or the image recording method to a certain extent, and the Smax and Smin within the desired image signal range are determined on the basis of an appropriate frequency threshold value. Accordingly, the values of the Smax and Smin obtained in accordance with the method are only just appropriate and cannot be sufficient, and the method can only be applied to limited histogram patterns.

Besides the case wherein the read-out conditions are to be adjusted for a radiation image stored on the stimulable phosphor sheet, determination of the desired image signal range is also necessary for various other purposes.

SUMMARY OF THE INVENTION

In view of the foregoing observations and description, the primary object of the present invention is to provide a method of determining the desired image signal range which can determine better the desired image signal range.

The method of the present invention comprises steps of dividing a histogram of image signals into a plurality of small regions by an automatic threshold value selecting method employing a discriminant criterion or a reference equivalent thereto, distinguishing a desired small region corresponding to a desired image portion in the small regions on the basis of information on the recorded image such as the image recording portion of the object, the recording method and the like, and determining the desired image signal range on the basis of statistics on the desired small region.

The method of the present invention is directed to determination of the desired image signal range carrying a desired portion of the recorded image recorded on a recording medium, and the recording medium need not be limited to the stimulable phosphor sheet.

In said division by the automatic threshold value selecting method employing the discriminant criterion, a so-called class separation is calculated and the histogram is divided where the class separation becomes maximum. As the reference equivalent to the discriminant criterion (is mathematically equivalent and gives the same result as the discriminant criterion), a least squares reference, a correlation reference or the like can be used. The discriminant criterion and the least squares reference are described in "Denshi Tsushin Gakkai Ronbunshi (Electronic Communication Academy Paper Magazine)" 1980/4, Vol.J63-DNo.4, pages 349 to 356. The correlation reference is described in "Denshi Tsushin Gakkai Ronbunshi (Electronic Communication Academy Paper Magazine)" 1986/9, Vol.J63-DNo.9, pages 1355 to 1356.

By the term "image recording portion of the object" as used herein is meant the portion of the object recorded on the recording medium such as the head, chest or abdomen. In the recording method, plane image recording, contrasted image recording, axial image recording and the like are included. Further, by the term "information on the recorded image" are meant various information by which the recorded image can be distinguished.

Further, by the term "statistics on the desired small region" as used herein are meant various amounts obtained by statistically processing the data on the small region such weighted average, variance and the like.

As described above in conjunction with an axial recording of the lap, a recorded image generally comprises a plurality of image portions the image signal level (density) range of which are different from each other (though generally partly overlapping), and the image signal histogram of the whole image are formed of the image signal histograms of the respective image portions combined together. Accordingly, basically the image signal histogram of the whole image can be divided in the image signal direction into a plurality of small regions the number of which equal to the number of the image portions.

In accordance with the automatic threshold value selecting method, the image signal histogram can be very appropriately divided into a plurality of small regions correctly corresponding to the respective image portions.

Further, the number of the image portions and the order of the image signal level ranges of the respective image portions can be known in advance on the basis of the information on the image such as the image recording portion of the object, the recording method and the like.

Accordingly, by obtaining in advance the number of the image portions forming a given recorded image and the order of the image signal level ranges of the image portions on the basis of the image recording portion of the recorded image and the recording method, and dividing the image signal histogram of the whole image into a plurality of small regions each corresponding to one of the image portions by the automatic threshold value selecting method, it is possible to know which of the small regions of the image signal histogram corresponds to a desired image portion.

Further, since the desired small region is the main portion of the desired image signal range carrying the desired image portion, the desired image signal range, that is, said Smax and Smin can be very appropriately determined by determining them by the use of statistics of the desired small region, e.g., the average and the variance.

Further, in accordance with the method of the present invention, since the image signal histogram is divided by the automatic threshold value selecting method, the histogram can be sufficiently appropriately divided irrespective of the pattern thereof and accordingly, the method of the present invention can be very widely applied.

DESCRIPTION OF THE PREFERRED EMBODIMENT

Figure 2:
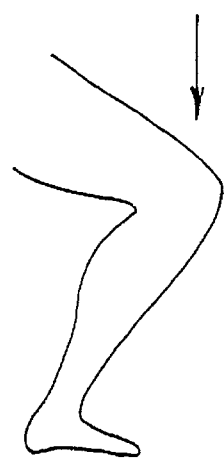
FIG. 2 is a view showing axial image recording of the lap.

An embodiment of the present invention which is applied to determination of a desired image signal range in the case that the lap is recorded on a stimulable phosphor sheet in the manner shown in FIG. 2 will be described, here in below. In this embodiment, the desired image portion in the recorded image is the knee portion, and the desired image signal range is the range of the image signal carrying the knee portion.

The preliminary read-out is carried on the stimulable phosphor sheet on which the lap has been recorded, thereby obtaining preliminary read-out image signals carrying the recorded image. That is, the stimulable phosphor sheet is scanned by stimulating rays for the preliminary read-out, and light emitted by the sheet upon stimulation is converted by a photoelectric convector into electric image signals representing the light quantity emitted from the respective scanning spots (picture elements) on the sheet.

Thereafter, the histogram of the image signals is obtained and is divided into a plurality of small regions by the automatic threshold value selecting method employing the discriminant criterion.

Figure 3:
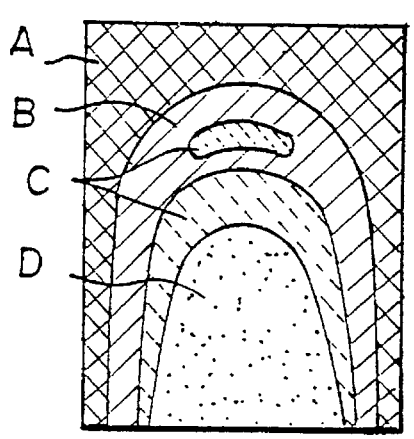
FIG. 3 shows the recorded image obtained by the recording shown in FIG. 2.

In this embodiment, the recorded image is as shown in FIG. 3, and the image signal levels are broadly divided into four levels, one corresponding to an empty image portion A exposed to part of the radiation passing by the lap, another corresponding to a soft part image portion B exposed to part of the radiation passing through soft parts of the knee like skin, another corresponding to a knee image portion C exposed to part of the radiation passing through the knee, and the other corresponding to an overlapping bone image portion D exposed to part of the radiation passing through overlapping bones. The image signals carrying each of the image portions are within an image signal (image signal level) range having a predetermined width, and the image signal ranges for the respective image portions are offset in the image signal level direction though partly overlapped. The level of the image signal range for the empty image portion A is the highest, and lowers in alphabetical order. That is, the image signal histogram of the whole recorded image is formed of the image signal histograms of the four image portions combined together, and accordingly, by dividing the image signal histogram of the whole recorded image into four small regions at most separatory positions, the respective small regions correspond to the image signal histograms of the four image portions. That is, the range of each small region corresponds to the image signal level range carrying the corresponding image portion.

That the recorded image is formed of four image portions carried by image signals having different level ranges the order of which is as described above can be known in advance on the basis of the information that the image recording portion is the lap and the recorded image is recorded by the axial image recording. Accordingly, which of the four small regions obtained by dividing the image signal histogram of the whole image at the most separatory positions correspond to the four image portions can be known. That is, which of the four small regions corresponds to the desired image portion can be known.

The method of dividing the image signal histogram of the whole image into the four small regions at the most separatory positions by the automatic threshold value selecting method employing the discriminant criterion will be described with reference to FIG. 1, hereinbelow.

Figure 1:
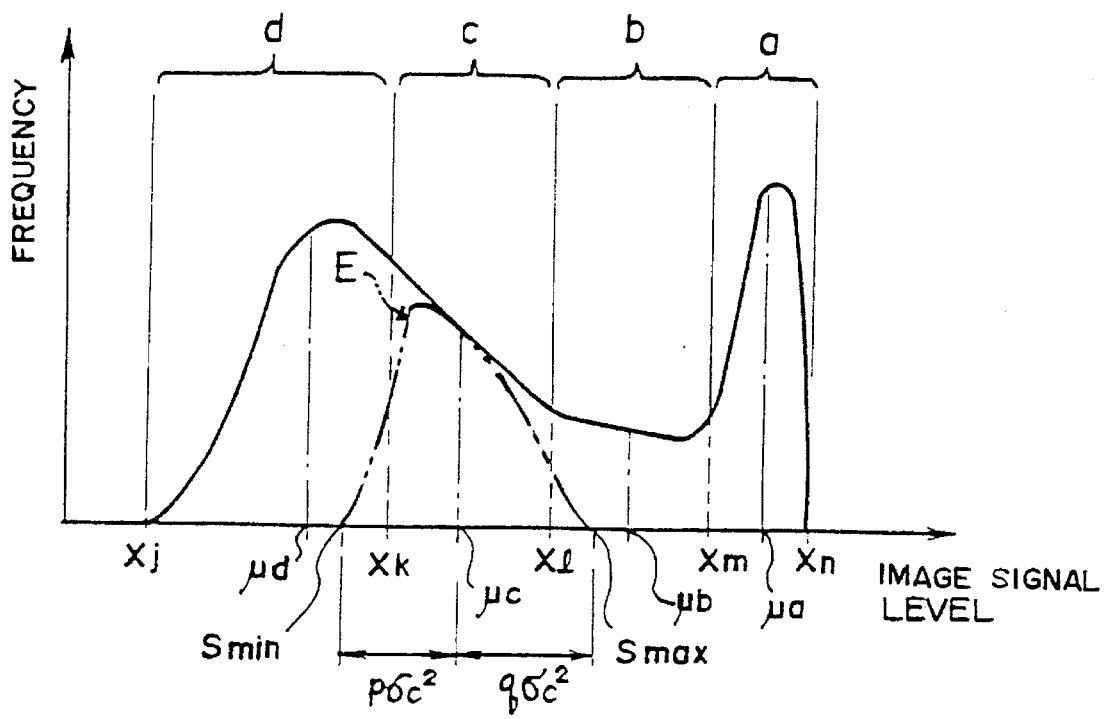
FIG. 1 is a view for illustrating division of the image signal histogram in accordance with the present invention.

FIG. 1 is a histogram of the preliminary read-out image signals carrying the recorded image shown in FIG. 3. First the histogram is divided into four small regions a to d in the abscissa direction (the image signal level direction) at arbitrary image signal levels Xk, Xl and Xm, and the class separation R is calculated on the basis of the following formula.

$$R = \omega d(\mu d - \mu t)^2 + \omega c(\mu c - \mu t)^2 + \omega b(\mu b - \mu t)^2 + \omega a(\mu a - \mu t)^2$$

wherein $\omega a$ to $\omega d$ represent the proportions of the number of the picture elements in the respective small regions a to d to the number of all the picture elements and the sum of $\omega a$ to $\omega d$ is equal to 1, and $\mu a$ to $\mu d$ and $\mu t$ respectively represent the frequency-weighted averages (the average image signal levels) for the small regions a to d and the whole region and are as follows.

$$\mu d = \frac{1}{\sum_{i=1}^{k} f(Xi)} \sum_{i=1}^{k} Xi \cdot f(Xi)$$

$$\mu c = \frac{1}{\sum_{i=k+1}^{l} f(Xi)} \sum_{i=k+1}^{l} Xi \cdot f(Xi)$$

$$\mu b = \frac{1}{\sum_{i=l+1}^{m} f(Xi)} \sum_{i=l+1}^{m} Xi \cdot f(Xi)$$

$$\mu a = \frac{1}{\sum_{i=m+1}^{n} f(Xi)} \sum_{i=m+1}^{n} Xi \cdot f(Xi)$$

$$\mu t = \frac{1}{\sum_{i=1}^{n} f(Xi)} \sum_{i=1}^{n} Xi \cdot f(Xi)$$

wherein f(Xi) represents the frequency at image signal level Xi.

The class separation R is repeatedly calculated while the arbitrarily selected image signal levels Xk, Xl and Xm are changed, and the histogram is divided at the values of the Xk, Xl and Xm at which the class separation R is maximized.

Thereafter, the desired small region is distinguished in the four small regions thus obtained. Since it has been known that the desired image portion is the knee image portion C and the level of the image signals of the knee image portion C is the second lowest, it can be known that the small region c is the desired small region.

Then the desired image signal range (Smax–Smin) is determined by the use of statistics on the desired small region c. The desired image signal range is the range of the image signals carrying the knee image portion which is the desired image portion in this particular embodiment and the histogram of the desired image signal range is as shown by chain line E in FIG. 1, for example. That is, though the desired small region c between Xk and Xl forms the main part of the desired image signal range (Smin to Smax), it does not perfectly coincide with the desired image signal range. Generally, the latter is wider than the former as can be understood from FIG. 1, and accordingly, an appropriate desired image signal range is determined on the statistics on the desired small range c taking the fact into account.

In this embodiment, the weighted average $\mu c$ of the the desired small region c and the variance $\sigma c^2$ of the desired small region c are employed as the statistics and the Smax and Smin are determined on the basis of the following formula.

$$Smin = \mu c - p\sigma c^2$$

$$Smax = \mu c + q\sigma c^2$$

wherein p and q are empirically determined coefficients.

The Smax and Smin may be determined on the basis of other statistics, or the Xk and Xl may be adopted as the statistics. In the latter case, the Smax and Smin are respectively equal to the Xl and Xk. Further, the Smax and Smin may be determined taking into account ocher amounts in addition to the statistics on the desired small region c.

Though, in the embodiment described above, the present invention is applied to the preliminary read-out image signals, the present invention may be applied to the final read-out image signals or may be applied to even image signals read out from a recording medium other than the stimulable phosphor sheet.

The number of the small regions may be appropriately selected according to the kind of the recorded image, the desired image portion and the like.

Further, though, in the embodiment described above, the desired small region is determined so as to correspond to a single small region, the desired small region may be determined so as to correspond to two or more small regions if desired. For example, when the soft image portion B and the knee image portion C are necessary, the desired small region may be determined to be the region comprising the small regions b and c.

Figure 4:
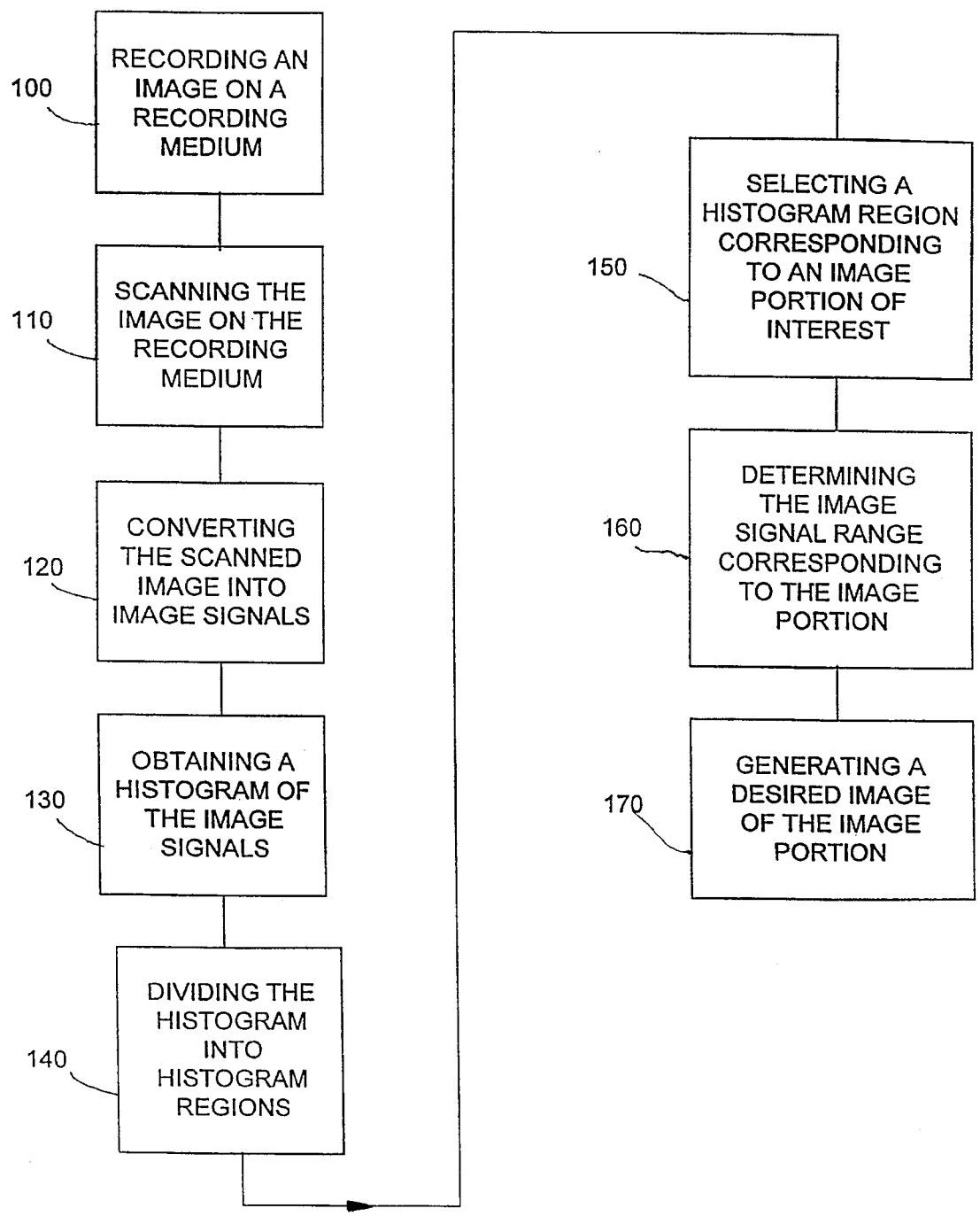
FIG. 4 is a flow diagram of the method performed by the present invention.

FIG. 4 depicts a flow diagram associated with the above-described method of determining an image signal. In step 100, an image is recorded on a recording medium. As mentioned above, this image may be of a knee. In step 110, the image on the recording medium is scanned. In step 120, the scanned image is converted into image signals. Subsequently, in step 130 a histogram is obtained of the image signals. In step 140, the histogram is divided into a group of histogram regions which each correspond substantially to a different one of the above-mentioned image portions. The histogram is divided using a pre-determined threshold value selecting method employing a discriminant criterion or a specific reference criterion. In step 150, a particular histogram region is selected from the group of histogram regions which corresponds to a particular image portion of pre-determined interest. This selection is made based on information about the image recorded on the recording medium. In step 160, an image signal range is determined which corresponds to the particular image portion based on a statistical analysis of the image signal range of the selected histogram region. The statistical analysis is carried out by obtaining a weighted average and a variance for the image signals in the particular image portion. In step 170, a desired image associated with the particular image portion is generated using the determined image signal range corresponding to the particular image portion, the image signal range having boundaries which are described above in connection with the variables Smin and Smax.

The desired image signal range thus determined may be used for determining the read-out conditions, the image processing conditions and the like, and for other various purposes.

I claim:

1. A method of determining an image signal range corresponding to a particular image portion of an image recorded on a recording medium, the image having a plurality of image portions, the method comprising:

scanning and converting said image on said recording medium into image signals;

obtaining a histogram of said image signals for the recorded image;

dividing said histogram into a plurality of histogram regions which each correspond substantially to a different one of said plurality of image portions, by performing said dividing using a predetermined threshold value selecting method employing a discriminant criterion or a reference equivalent thereto;

selecting one histogram region of the plurality of histogram regions which corresponds to the particular image portion of predetermined interest on the basis of information about the image recorded on the recording medium;

determining the image signal range corresponding to the particular image portion based on statistical analysis of the image signal range of the one selected histogram region, wherein said statistical analysis is carried out by obtaining a weighted average and a variance for the image signals in the particular image portion; and generating a desired image of the particular image portion using the determined image signal range corresponding to the particular image portion;

wherein said image signal range corresponding to the particular image portion has first and second boundaries Smin and Smax, respectively, and said first and second boundaries are determined according to the following equations:

$$Smin = \mu c - p\sigma c^2$$

$$Smax = \mu c - q\sigma c^2$$

where $\mu c$ is said weighted average, $\sigma c^2$ is said variance, and p and q are empirically determined coefficients.

2. The method of claim 1, wherein said threshold value selecting method is performed by maximizing a class separation R, said class separation being calculated by selecting a plurality of initial small regions, and maximizing the sum of $wx_i(\mu x_i - \mu t)^2$ for each small region i, wherein $wx_i$ represents the proportion of the number of picture elements in the $i^{th}$ initial small region to the total number of picture elements for all regions, $\mu x_i$ represents a frequency-weighted average for the $i^{th}$ initial small region, and $\mu t$ represents a frequency-weighted average for all regions.

3. The method of claim 1, wherein the image recorded on a recording medium is a radiation image recorded on a stimulable phosphor sheet.

4. The method of claim 1, wherein the step of generating the desired image further comprises:

the step of determining read-out conditions based upon the determined image signal range.

5. A method as defined in claim 1, wherein the step of scanning and converting includes optically scanning said image.

6. A method of determining an image signal range corresponding to a particular image portion of an image recorded on a recording medium, the image having a plurality of image portions, the method comprising:

scanning and converting said image on said recording medium into image signals;

obtaining a histogram of said image signals for the recorded image;

dividing said histogram into a plurality of histogram regions which each correspond substantially to a different one of said plurality of image portions, by performing said dividing using a predetermined threshold value selecting method employing a discriminant criterion or a reference equivalent thereto;

selecting one histogram region of the plurality of histogram regions which corresponds to the particular image portion of predetermined interest on the basis of information about the image recorded on the recording medium;

determining the image signal range corresponding to the particular image portion based on statistical analysis of the image signal range of the one selected histogram region, wherein said statistical analysis is carried out by obtaining a weighted average and a variance for the image signals in the particular image portion; and generating a desired image of the particular image portion using the determined image signal range corresponding to the particular image portion;

wherein said threshold value selecting method is performed by maximizing a class separation R, said class separation being calculated by selecting a plurality of initial small regions, and maximizing the sum of $wx_i(\mu x_i - \mu t)^2$ for each small region i, wherein $wx_i$ represents the proportion of the number of picture elements in the $i^{th}$ initial small region to the total number of picture elements for all regions, $\mu x_i$ represents a frequency-weighted average for the $i^{th}$ initial small region, and $\mu t$ represents a frequency-weighted average for all regions.

7. The method of claim 6, wherein the image recorded on a recording medium is a radiation image recorded on a stimulable phosphor sheet.

8. The method of claim 6, wherein the step of generating the desired image further comprises:

the step of determining read-out conditions based upon the determined image signal range.

* * * * *